United States Patent [19]
Davis

[11] 3,971,531
[45] July 27, 1976

[54] PNEUMATIC COURIER DISPATCH UNIT

[76] Inventor: Orin H. Davis, 6620 N. 16th Drive, Phoenix, Ariz. 85015

[22] Filed: Feb. 20, 1975

[21] Appl. No.: 551,307

[52] U.S. Cl. .................................... 243/25; 243/28
[51] Int. Cl.[2] ........................................ B65G 51/28
[58] Field of Search .............. 243/1, 19, 25, 28, 38, 243/20, 21, 22, 23, 29

[56] References Cited
UNITED STATES PATENTS

| | | | |
|---|---|---|---|
| 451,619 | 5/1891 | Leaycraft .......................... | 243/25 X |
| 681,414 | 8/1901 | Fordyce .............................. | 243/25 |
| 1,660,293 | 2/1928 | Cowley ............................... | 243/23 |
| 1,951,367 | 3/1934 | Needham ............................ | 243/25 |

*Primary Examiner*—John J. Love
*Assistant Examiner*—James L. Rowland
*Attorney, Agent, or Firm*—Cahill, Sutton & Thomas

[57] ABSTRACT

A dispatch unit for inserting pneumatically propelled couriers into a pneumatic courier system is disclosed. A pair of symmetric pivotable doors extend across the input aperture of the dispatch unit. The doors, linked together by a central sliding member, pivot upwardly in response to upward insertion of the courier to receive the courier and pivot downwardly to close the input aperture after the courier has passed therethrough by force of their own weight. For locations requiring downward insertion of the courier, the dispatch unit is turned upside down and an additional weighted member is operatively linked to each door. The doors pivot downwardly in response to insertion of the courier and pivot upwardly after the courier has been inserted in response to the force exerted by the weighted members.

6 Claims, 7 Drawing Figures

U.S. Patent   July 27, 1976   3,971,531
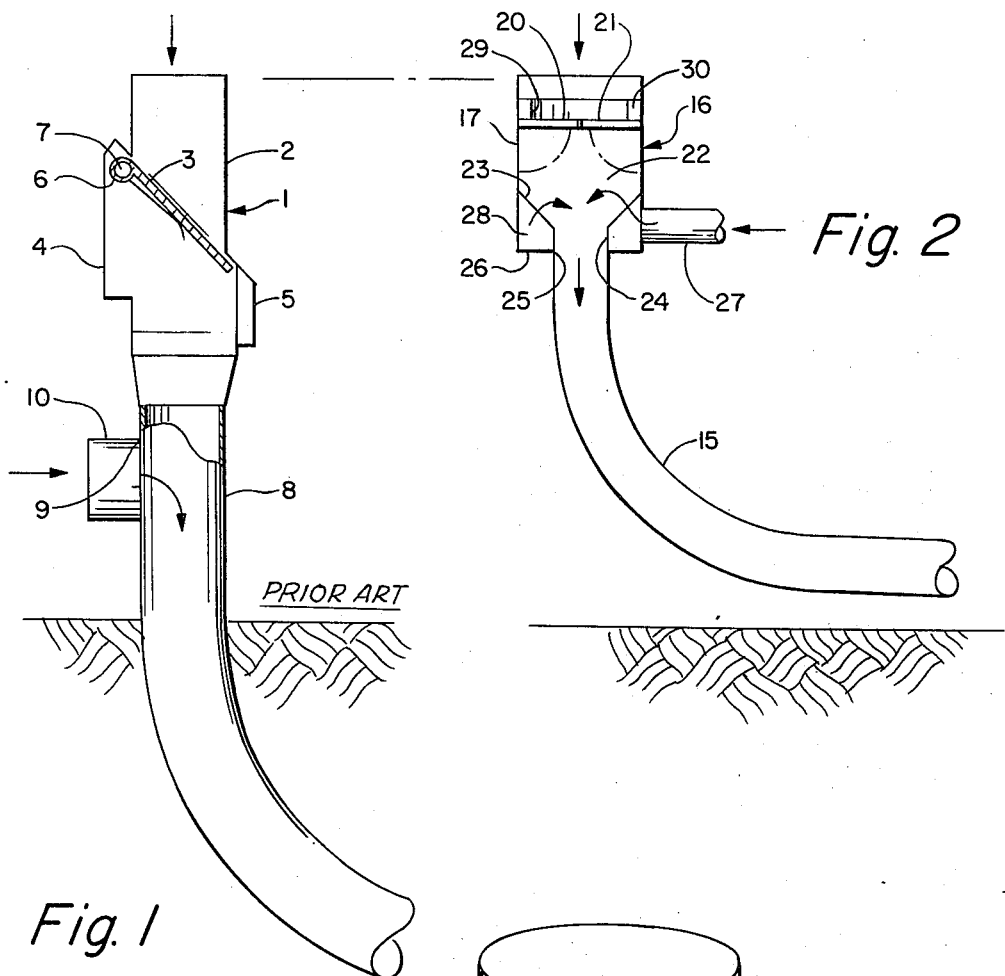
Fig. 1 PRIOR ART
Fig. 2
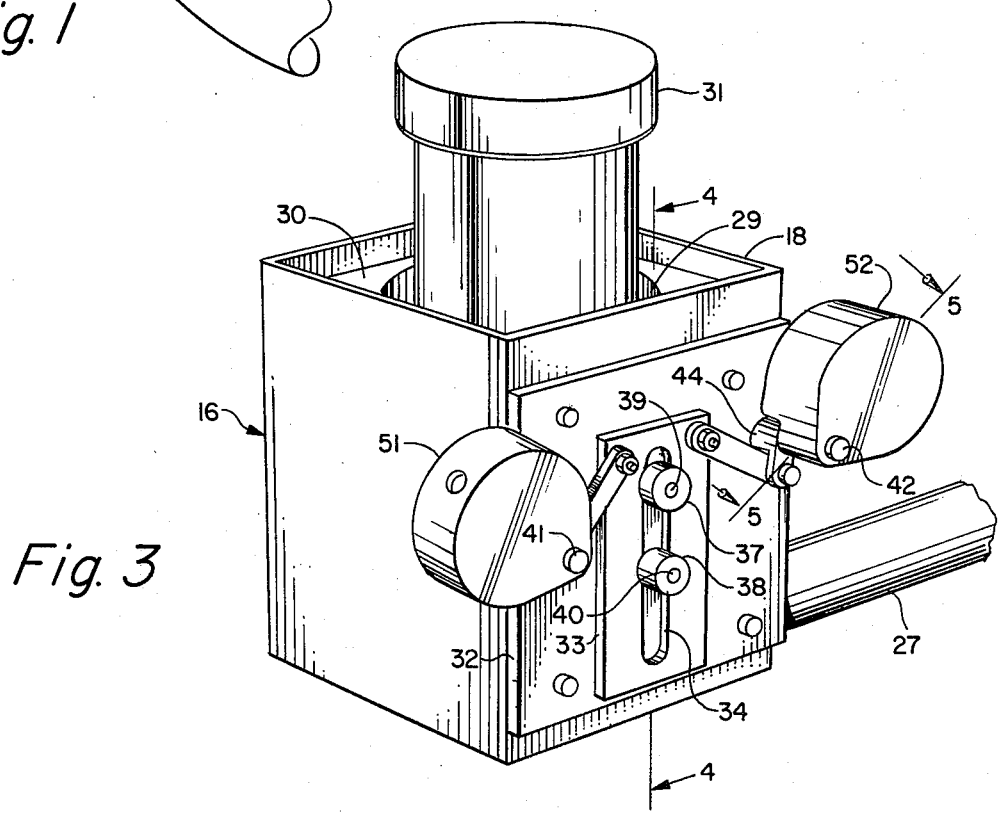
Fig. 3

PNEUMATIC COURIER DISPATCH UNIT

The present invention relates to pneumatically operated courier systems and, more particularly, to dispatch units for couriers.

Pneumatically operated systems for transporting couriers have been in use for several decades. Consequently, various gate units have been developed for both receiving and discharging the transported couriers. In example, U.S. Pat. No. 519,718, describes a receiving station having a gravity operated gate tripped open by the courier when the courier approaches the gate. The gate must be manually reset to preserve the propelling air flow within the pneumatic system. U.S. Pat. No. 730,715, describes an electrically actuated gate, which gate is opened and closed by switch means tripped by movement of the courier therepast. U.S. Pat. No. 178,784, illustrates a spring biased multi-doored aperture through which a courier is manually inserted into the pneumatic transport system. U.S. Pat. No. 737,271, describes a receiving unit for couriers, which unit includes a plurality of levers actuated by passage of the courier to open the discharge gate and redirect the flow of air within the courier transport system. U.S. Pat. No. 1,660,293, describes a station for both receiving and discharging couriers. The station embodies a chamber for receiving a courier and from which chamber the courier drops laterally through weighted doors.

Although different apparatus is described in each of the above enumerated patents, all the apparatus have one feature in common. That is, they require the use of movable or pivotable gates or gate associated elements removed from the courier inlet or outlet by an amount at least equivalent to the length of the courier. Periodic maintenance requirements precludes rendering the gates and/or gate elements inaccessible. Thereby, the installation must afford lateral access to the gates and/or gate elements which imposes limitations upon the location of courier terminals.

The present day high cost of office space generally places a premium upon compactness of all office equipment. Further, the high cost of maintenance, down time due breakdown and repair work of any office equipment renders reliability of paramount importance. The existing courier transport systems are bulky and have a high parts count which inherently is inversely proportional to reliability. Thus, the existing courier transport systems are not commensurate with present day demands for office equipment.

Present pneumatic courier systems are being installed by banks at drive-in tellers. The low profile of most cars places the sill of the driver's window two to three feet above the ground. Hence, the courier input or dispatch unit must be low enough to be within easy reach for the driver. To install a pneumatic transport system at existing drive-in teller locations, it is expedient and practical to route the ducting above ground to the courier receiving location. From a cost standpoint it is almost mandatory that the existing ground level foundation, usually a concrete slab, need not be channeled to receive the ducting. It has further been found that the most useable and practical means for inserting a courier into a duct is that of dropping the courier vertically downwardly into the dispatch unit. When all of the above considerations are taken collectively, it becomes apparent that the dispatch unit should be vertically oriented and mounted no higher than three feet above the ground.

None of the prior art courier dispatch stations can be mounted three feet or less above the ground while affording sufficient radius to the attached ducting to permit passage of the courier therethrough without having the ducting extend below ground level. Earlier pneumatic courier transport systems were generally employed for interoffice communication or within manufacturing facilities. At such locations few limitations, if any, were imposed upon the terminals or the routing of the ducts due to the general availability of adequate space.

It is therefore a primary object of the present invention to provide a compact dispatch unit for a pneumatic courier transport system.

Another object of the present invention is to provide a dispatch unit optimized in size along the longitudinal axis.

Yet another object of the present invention is to provide springless doors for a dispatch unit.

Still another object of the present invention is to provide doors for a dispatch unit which close in response to the force of gravity.

A further object of the present invention is to provide a dispatch unit having all maintenance required elements external to the unit and in proximity to the input aperture.

A still further object of the present invention is to provide a means for effectively sealing the input aperture of a courier dispatch unit.

A yet further object of the present invention is to provide a means for employing the air flow within the courier transport system to draw the courier therein after partial insertion of the courier into a dispatch unit.

These and other objects of the present invention will become apparent to those skilled in the art as the description thereof proceeds.

The present invention may be described with greater specificity and clarity with reference to the following drawings, in which:

FIG. 1 illustrates a representation of a presently used prior art courier dispatch unit.

FIG. 2 illustrates the size of the present invention in relation to the prior art dispatch unit shown in FIG. 1.

FIG. 3 is an isometric view of a dispatch unit constructed in accordance with the teachings of the present invention.

Figure 4:
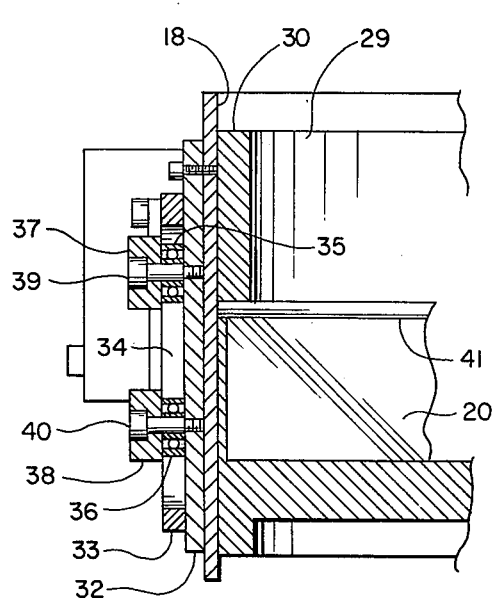
FIG. 4 is a cross-sectional view taken along lines 4—4, as shown in FIG. 3.
Figure 6:
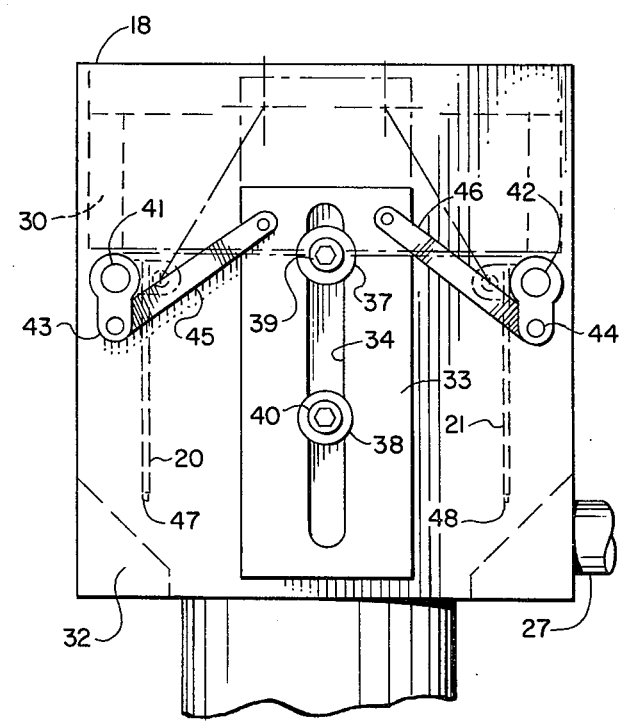
FIG. 6 is a lateral view of the mechanism employed in the present invention.

A typical presently available courier dispatch unit 1 is illustrated in FIG. 1. The dispatch unit is generally formed of a cylindrical tube 2 of a diameter appropriate to receive an inserted courier. A flap 3 is pivotally mounted centrally within tube 2. Laterally extending housing members 4, 5 are added to accommodate the pivotal movement of the flap and its seat. Flap 3 is biased into the closed position (illustrated) by the arms of a coil spring 6, which spring is mounted at the hinge point 7. A conduit 8 is attached to the lower end of tube 2, which conduit channels the inserted courier to its intended destination. The minimum radius of curvature of conduit 8 is defined by the length of the inserted courier in combination with the degree of permissible tolerance between the annular air seals about the courier and the inner surface of the conduit. An air pressure source is connected to conduit 8 through an inlet orifice 9 defined by pipe 10.

On insertion of a courier into the prior art dispatch unit 1, flap 3 is pushed downwardly against the force of spring 6, which force increases proportionally to the pivotal movement of the flap. Immediately upon the unseating of flap 3, the air flow from pipe 10 will flow through the laterally extending volume defined by housing members 4 and 5 and exhaust through the inlet of the dispatch unit. The exhausting air will cause a drop in air pressure within the courier transport system and also disturb and inconvenience a user located in proximity to the dispatch unit. As the courier is inserted past flap 3, the flap will tend to bias the courier against the side opposite hinge point 7, which may cause binding and wear of the annular seals about the courier. The location of air inlet orifice 9 dictates that the courier be essentially completely inserted past flap 3 before the air flow from pipe 10 can exert a propelling force upon the courier. Hence, insertion of the courier must be made with care and deliberation.

The seat for flap 3 is inherently difficult to render air tight due to the physical arrangement of the flap. Therefore, the seat seal is generally not sufficiently air tight to prevent air leakage therethrough, which air leakage generates a disturbing noise.

The extensive longitudinal dimension of the dispatch unit, coupled with the straight section of conduit 8 in proximity to pipe 10, dictates that the overall vertical dimension from the top of the dispatch unit to the bottom of the 90° curved conduit 8 is approximately forty inches. Such a vertical dimension renders the prior art apparatus essentially non-feasible for use in drive-in bank teller stations as the existing ground level concrete must be excavated to accommodate the conduit to maintain the maximum three foot above ground limitation. The added cost of such excavation severely restricts the utility of the prior art dispatch units.

FIG. 2 illustrates an elevational view of a dispatch unit 16 constructed in accordance with the present invention attached to a conduit 15. For visual comparison purposes, conduit 8 (see FIG. 1) and conduit 15 are shown with the same curvature and the input to dispatch unit 16 is shown at the same elevation as that of dispatch unit 1. By observation, it becomes readily apparent that the present invention requires substantially less vertical space. In practice, the vertical displacement of the present invention attached to a 90° bend conduit has averaged approximately 22 inches. Hence, the reduced vertical height requirement of the present invention renders it possible to install a courier transport system in many existing locations without incurring the expense of removing or channeling existing structures.

The dispatch unit 16 is formed within and by an essentially rectangular open ended housing 17. A pair of downwardly pivotable doors 20 and 21 are located in proximity to open end 18. As will be discussed in further detail below, doors 20 and 21 are biased into the closed position by means of linked gravity responsive weights. Within chamber 22 of dispatch unit 16 there are disposed a plurality of internally extending spokes 23. The internal extremities of spokes 23 are attached to and support a cylindrical passageway 24, which passageway extends external to dispatch unit 16 through aperture 25 disposed within end 26. A source of air pressure is conveyed into chamber 22 through an air inlet pipe 27, which pipe is operatively attached to housing 17 in proximity to end 26. The air flowing through pipe 27 flows into a plenum chamber 28, which plenum chamber is defined by the lateral wall of housing 17, end plate 26, the wall of passageway 24 and spokes 23. The air escapes from within plenum chamber 28 through the spacing intermediate spokes 23 into the main body of chamber 22 and thence through passageway 24 into conduit 15. Any escape of air through open end 18 is prevented by doors 20 and 21.

The overall operation of the present invention as depicted in FIG. 2 may be described as follows. Insertion of a courier through open end 18 into chamber 22 forces doors 20 and 21 to pivot downwardly. As soon as the annular seal about the lower end of the inserted courier engages passageway 24, the ambient pressure within chamber 22, being greater than that within conduit 15, will tend to draw the courier into the conduit without further externally applied aid. The pressure buildup within chamber 22 is augmented by plate 30 extending across the interior of housing 17 external to doors 20 and 21 in that aperture 29 disposed in the plate is of a diameter just sufficient to afford passage of the courier. Thus, the escape of air from chamber 22 through opening 18 is limited to the air escaping intermediate the side of the courier and the aperture 29. Shortly after the courier begins its passage through conduit 15, the trailing end of the courier will clear the edges of doors 20 and 21, thereby permitting the doors to close in response to the force of gravity acting upon linked weighted members. Further, the ambient pressure within chamber 22 is generally greater than that external to housing 17 whereby the air pressure within the chamber will aid in closing of doors 20, 21.

From this description it may be appreciated that the axial length of dispatch unit 16 need only be sufficient to accommodate the downward pivotal movement of doors 20 and 21, which doors, in turn, need only be slightly wider than the radius of the inserted courier. The portion of the dispatch unit beneath the downwardly pivoted doors need only be of sufficient depth to accommodate plenum chamber 28 and the attached pipe 27. It may therefore be appreciated that the arrangement of operative elements has been specifically configured to minimize the axial length of the dispatch unit.

In practice is has been learned that a dispatch unit constructed in accordance with the present invention and attached to a downwardly oriented conduit having a 90° bend requires a vertical displacement of only twenty-two inches from the courier input point to the bottom of the curved conduit. This constitutes a substantial commercial benefit over existing systems in that the present invention may be incorporated in existing facilities without having to carve out or otherwise cut into existing foundations.

The operative mechanism forming dispatch unit 16 will be described with particular reference to FIGS. 3, 4, 5 and 6. A transversely oriented apertured plate 30 is secured within open end 18, the aperture of which is configured to receive a courier 31. A pivot plate 32 is attached to one side of the dispatch unit and serves as the support for the various operative elements. A slotted sliding guide 33 is retained adjacent pivot plate 32 by bolts 39 and 40 acting upon washers 37 and 38, respectively. Ball bearings 35 and 36 are disposed within slot 34 and retained in place by bolts 39 and 40, respectively, to facilitate sliding action of the guide 33. Doors 20 and 21 are pivotally mounted interior to dispatch unit 16 by means of shafts 41 and 42, respectively. The far ends of these shafts may be disposed within cup-like bearings at the rear interior surface of the dispatch unit (see FIG. 7). The rear ends of these shafts extend through apertures within the front of the dispatch unit and pivot plate 32. Doors 20 and 21 are attached to their respective shafts tangential thereto such that in the closed position (see FIG. 6) the doors are adjacent the lower surface of plate 30.

Arms 43 and 44 are non-pivotally attached to the protruding ends of shafts 41 and 42, respectively. Links 45 and 46 pivotally interconnect the extremity of arm 43 to guide 33 and the extremity of arm 44 to guide 33, respectively. As illustrated by the dashed lines in FIG. 6, vertical movement of guide 33 results in the repositioning of links 45 and 46 to rotate arms 43 and 44 through an arc of 90°. As doors 20 and 21 are rigidly attached to arms 43 and 44, by taper pins, or the like, a commensurate 90° pivotal movement of the doors will occur.

Figure 5:
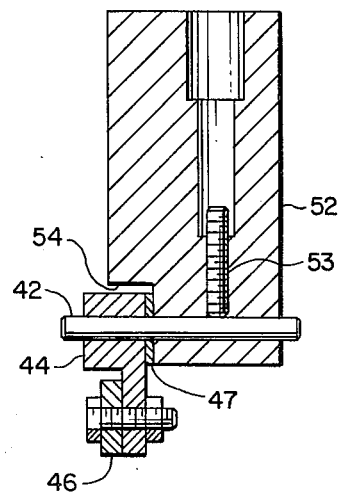
FIG. 5 is a cross-section taken along lines 5—5, as shown in FIG. 3.

By inspection, it becomes apparent from FIG. 5 that the weight of guide 33 in combination with the weight of doors 20 and 21 will tend to bias the doors into the open position. To bias the doors into the closed position for the embodiment of the present invention illustrated in FIG. 3, counterweights 51 and 52 are attached to shafts 41 and 42, respectively. A more detailed description of these counterweights will be presented with reference to FIGS. 3 and 5. Counterweight 52 is attached to the protruding end of shaft 42 by means of a set screw 53 or the like. To increase the compactness of the operative elements, a recess 54 is disposed within the counterweight to receive a part of the respective arm 44 and thereby permit the counterweights to be positioned closer to the front face of the dispatch unit. A washer, such as washer 47, may be disposed intermediate the counterweight and arm 44 to provide sufficient clearance between link 46 and the counterweight during pivotal movement therebetween. Alternatively, the counterweight may be appropriately recessed to prevent interference with the connected link. It is to be understood that counterweight 51 is similarly operatively mounted upon shaft 41.

The size of the counterweights is not critical provided that the rotational force produced by the counterweights is greater than the opposing rotational force produced by the doors, the guide and friction losses to ensure that the doors will be biased upwardly adjacent plate 30 in the closed position.

By incorporating a plate 30 having a circular aperture 29 at the input to the dispatch unit, several advantages are obtained. The diameter of aperture 29 is, per force, less than the length and combined width of doors 20 and 21. Thus, by providing a seal on the lower surface of plate 30 about the perimeter of aperture 29, air leakage intermediate the doors and plate 30 can be effectively prevented and there is no need for attempting to seal the hinge lines nor the sides of the doors adjacent the inside surfaces of the dispatch unit. By providing a compressible sealing member 47 and 48 (see FIG. 6) upon one or both of the door edges facing one another, air leakage intermediate the two doors can be effectively prevented. Those skilled in the art will appreciate that seals of this type can accommodate substantial misalignment or dimensional mismatching without derogating from the sealing capability.

In operation, insertion of courier 30 through aperture 29 in plate 30 will cause downward pivotal movement of doors 20 and 21 to receive the courier within the dispatch unit. Simultaneously, the counterweights will be forced upwardly by rotation of the attached pivot arms 43 and 44. Pivotal movement of the pivot arms will draw guide 33 downwardly through action of links 44 and 46. Because of the interconnection of doors 20 and 21 through the links and guide, both doors will open to the same degree and thereby ensure a centrally aligned insertion of the courier. This alignment is a particular advantage in preventing the courier from hanging up on the inlet of passageway 24 (see FIG. 2). As soon as the courier has cleared doors 20 and 21, the doors are free to respond to the force exerted by the counterweights and they will swing upwardly into the closed position.

Figure 7:
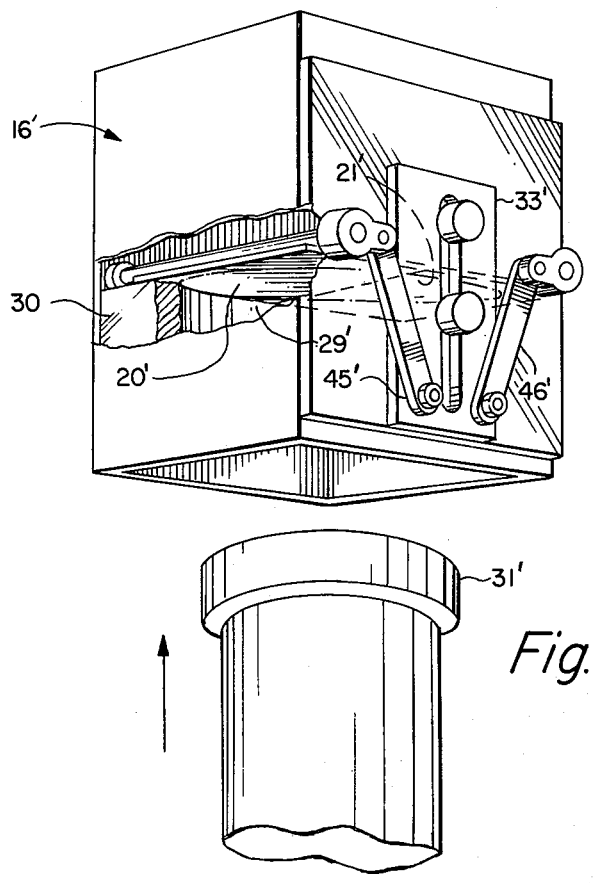
FIG. 7 is a partially cutaway perspective view of a variant of the present invention shown in FIG. 3.

Referring to FIG. 7, there is shown a dispatch unit constructed essentially similar to that shown in FIGS. 2, 3, 4 and 6, except that the dispatch unit 16' is used at locations favoring upward insertion of a courier 31'. Herein, doors 20' and 21' pivot upwardly from plate 30' with a corresponding upward movement of links 45' and 46' and guide 33'. After courier 31 has passed through aperture 29' and cleared doors 20' and 21', the combined weight and pivotal action of the upwardly displaced elements will tend to establish a biasing force to close doors 20' and 21'. Thus, in the embodiment of the present invention shown in FIG. 7, the need for ancillary counterweights has been obviated. It is to be understood that the remaining elements described above with respect to dispatch unit 16 remain the same.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. In a pneumatic courier system including (i) a plurality of stations connected by pneumatic ducts, (ii) a source of pressurized air for propelling couriers through the system, and (iii) at least one dispatch unit for receiving couriers into the system, said dispatch unit comprising in combination:
   a. a housing for receiving the couriers, said housing including an inlet and an outlet;
   b. a pair of doors for normally sealing the inlet of said housing, said pair of doors being openable in response to the insertion of a courier into the inlet of said housing, said pair of doors being biased to a normally closed position, each door in said pair of doors including a shaft, each end of which is pivotally mounted to said housing and at least one end of which extends through the external surface of said housing;
   c. means for linking the doors of said pair of doors to ensure commensurate movement of each door during insertion of a courier, said linking means comprising in combination:
      1. a first arm rigidly affixed to the externally extending end of one of said shafts;

2. a second arm rigidly affixed to the externally extending end of another of said shafts;

3. a slidable guide for interconnecting said first and second arms; and 4. link means disposed intermediate said guide and each of said first and second arms for translating pivotal movement of said first and second arms into sliding movement of said guide; whereby, said guide inhibits independent pivotal movement of one door in said pair of doors by inhibiting independent pivotal movement of said first or second arm;

d. a passageway extending from the outlet of said housing to the duct for directing a courier from said housing into the duct; and e. a pipe for establishing fluid communication between the source of pressurized air and said housing, whereby, the air pressure produced within said housing by the air inflowing through said pipe forces the courier through said passageway into the duct upon initial insertion of the courier into said passageway.

2. The dispatch unit as set forth in claim 1 wherein said guide is mounted to the external surface of said housing intermediate the externally extending ends of said shafts.

3. The dispatch unit as set forth in claim 2 wherein said first and second links are of equal length.

4. The dispatch unit as set forth in claim 3 wherein each door in said pair of doors in tangentially attached to the respective one of said shafts.

5. The dispatch unit as set forth in claim 3 including a weighted member rigidly attached to the externally extending part of each of said shafts for biasing the corresponding one of said pair of doors to the normally closed position.

6. The dispatch unit as set forth in claim 5 wherein said housing is oriented to receive downwardly thrust couriers and wherein each said weighted member is attached in an opposed relationship to the attachment of the corresponding one of said pair of doors, each said weighted member being of sufficient weight to establish a gravity induced pivoting force in opposition to and greater than the gravity induced pivoting force of the corresponding one of said pair of doors; whereby, said weighted members bias said pair of doors to the normally closed position.

* * * * *